(12) United States Patent
Amann et al.

(10) Patent No.: US 10,263,907 B2
(45) Date of Patent: Apr. 16, 2019

(54) MANAGING VIRTUAL NETWORK PORTS (71) Applicant: INTERNATIONAL BUSINESS MACHINES CORPORATION, Armonk, NY (US)

(72) Inventors: Stefan Amann, Boeblingen (DE); Gerhard Banzhaf, Boeblingen (DE); Joseph M. Gdaniec, Durham, NC (US); Jaya Srikrishnan, Poughkeepsie, NY (US); Eric A. Weinmann, Endicott, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 837 days.

(21) Appl. No.: 14/510,159

(22) Filed: Oct. 9, 2014

(65) Prior Publication Data
US 2015/0106518 A1    Apr. 16, 2015

(30) Foreign Application Priority Data
Oct. 16, 2013 (GB) .................................. 1318299.3

(51) Int. Cl.
*G06F 9/455* (2018.01)
*H04L 12/911* (2013.01)

(52) U.S. Cl.
CPC .......... *H04L 47/70* (2013.01); *G06F 9/45558* (2013.01); *G06F 2009/4557* (2013.01); *G06F 2009/45595* (2013.01)

(58) Field of Classification Search
CPC ... G06F 2009/45595; G06F 2009/4557; G06F 2009/45575; H04L 29/08549

USPC ............................................................ 718/1
See application file for complete search history.

(56) References Cited

U.S. PATENT DOCUMENTS

| | | | |
|---|---|---|---|
| 7,933,993 B1 * | 4/2011 | Skinner ................. | G06F 9/5077 709/209 |
| 8,700,811 B2 | 4/2014 | Oshins et al. | |
| 2007/0297428 A1 | 12/2007 | Bose et al. | |
| 2009/0025007 A1 * | 1/2009 | Hara ...................... | G06F 3/0607 718/105 |

(Continued)

*Primary Examiner* — Kevin T Bates
*Assistant Examiner* — Chen-Liang Huang
(74) *Attorney, Agent, or Firm* — William Kinnaman, Jr., Esq.; Blanche E. Schiller, Esq.; Heslin Rothenberg Farley & Mesiti P.C.

(57) ABSTRACT

Managing virtual network ports on a physical server to provide a virtual server access to a group of storage resources through a network. A storage access group representing a group of storage resources is generated. A virtual server is generated on a hypervisor executed on the physical server. Access to the network is activated for the virtual server. A management console is provided for creating and managing the storage access group providing access to the group of storage resources for the virtual server from one or more physical servers. The management console includes a virtual server management facility and a storage access group facility. The virtual server management facility allows for managing virtual server definitions and activating, deactivating, and migrating virtual servers. The storage access group facility allows for managing virtual network port descriptions, administrating network port names, and creating, activating and deactivating virtual network ports.

20 Claims, 7 Drawing Sheets

(56) References Cited

U.S. PATENT DOCUMENTS

| | | | |
|---|---|---|---|
| 2009/0307330 A1 | 12/2009 | Allen et al. | |
| 2010/0057913 A1* | 3/2010 | DeHaan | G06F 15/173 709/226 |
| 2012/0179846 A1* | 7/2012 | Haustein | G06F 3/061 710/38 |
| 2014/0282499 A1* | 9/2014 | Rosato | G06F 9/45533 718/1 |

* cited by examiner

MANAGING VIRTUAL NETWORK PORTS

PRIOR FOREIGN APPLICATION

This application claims priority from United Kingdom patent application number 1318299.3, filed Oct. 16, 2013, which is hereby incorporated herein by reference in its entirety.

BACKGROUND

One or more aspects of the present invention relate, in general, to data processing systems, and in particular, to managing virtual network ports through a network.

Network port names, also known as world wide port names (WWPNs), and associated network port identifiers (N_Port IDs), are part of the IEEE (Institute of Electrical and Electronics Engineers) Fibre Channel Standard. Virtualization of Fibre Channel (FC) network ports, also known as N_Port ID Virtualization (NPIV), allows sharing of physical FC ports by multiple operating systems by letting each operating system have its own world wide port names. An operating system may receive access to logical units (LUN) through a SCSI (Small Computer System Interface) target port in a storage area network (SAN) by using one or more WWPNs owned by the operating system. This capability architecturally allows multiple operating systems to share a physical FC port. One or multiple FC ports may be hosted on a single FC adapter. Multiple operating systems may share a server that has firmware and software capabilities to provide SCSI input/output (I/O) services to each operating system by virtualizing physical hardware.

US 2009/0307330 A1, incorporated by reference herein in its entirety, discloses a method and system of migrating a client partition from one server to another server. The client partition is migrated while the client partition is running without I/O failures, loss of service or decreased network security.

In US 2009/0307330 A1, incorporated by reference herein in its entirety, a computer implemented method is provided for migrating a client between servers, the method comprising generating a pair of WWPNs for a virtual Fibre Channel adapter, the virtual Fibre Channel adapter being associated with a client. The server is foreseen to support the migration of WWPNs among the different systems, whereas the user is faced with managing the individual virtual Fibre Channel adapters.

BRIEF SUMMARY

Managing virtual network ports (vNPs) in a system in an automated way with reduced input needed from a system administrator is provided in one or more aspects.

According to one aspect, a method of managing virtual network ports on a physical server to provide a virtual server access to a group of storage resources through a network is provided. The method includes, for instance, generating a storage access group representing a group of storage resources; executing a hypervisor on the physical server; generating a virtual server on the hypervisor; activating access to the network for the virtual server; and providing a management console to create and manage the storage access group providing access to the group of storage resources for the virtual server from one or more physical servers, the management console comprising a virtual server management facility and a storage access group facility, wherein the virtual server management facility allows for managing virtual server definitions and activating, deactivating, and migrating virtual servers, and wherein the storage access group facility allows for managing virtual network port descriptions, administrating network port names, and creating, activating and deactivating virtual network ports.

BRIEF DESCRIPTION OF THE SEVERAL VIEWS OF THE DRAWINGS

Aspects of the present invention together with objects and advantages may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of aspects of the invention. Moreover, the drawings are intended to depict only typical embodiments of the invention and therefore should not be considered as limiting the scope of the invention.

Figure 1:
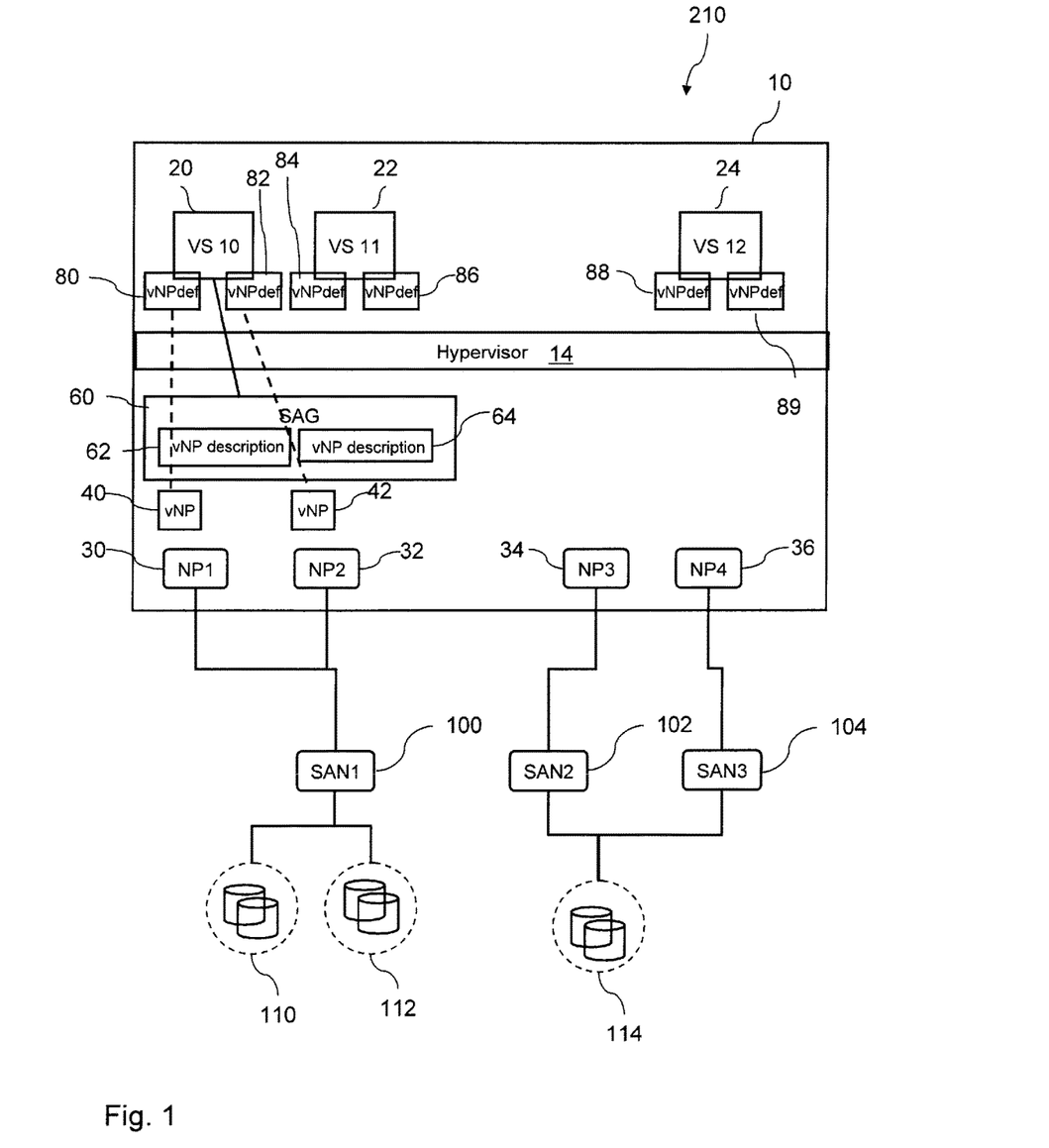
FIG. 1 an overview of a network based data processing system for storage access through virtual network ports according to an embodiment of the invention.

In FIG. 1 an overview of a network based data processing system 210 for storage access through virtual network ports 40, 42, . . . according to an embodiment of the invention is depicted. A physical server 10 is shown, running a plurality of virtual servers 20, 22, 24 on a hypervisor 14. The physical server 10 exhibits a plurality of network ports (NPs) 30, 32, . . . acting as physical network ports to several storage area networks (SAN) 100, 102, 104, connected to the physical server 10 and exhibiting a plurality of storage resources 110, 112, 114. Virtual network port definitions 80, 82 describe that virtual server 20 requires access to the group of storage resources 110, represented by storage access group 60. Each virtual network port definition 80, 82, 84, 86, . . . further contains a device identifier to allow a virtual server to consistently associate configuration information with the network connection established based upon the parameters of the virtual network port definition. Storage access group 60 contains at least one virtual network port description for network ports 30, 32 providing access to the group of storage resources 110. The connection of the virtual server 20 to the network 100 via the NPs 30, 32 is achieved by determining virtual network port descriptions 62, 64, matching virtual network port definitions 80, 82 and activating the vNPs 40, 42 based upon the parameters defined by virtual network port descriptions 62, 64, which are contained in the storage access group (SAG) 60, and virtual network port definitions 80, 82 of the virtual server.

Figure 2:
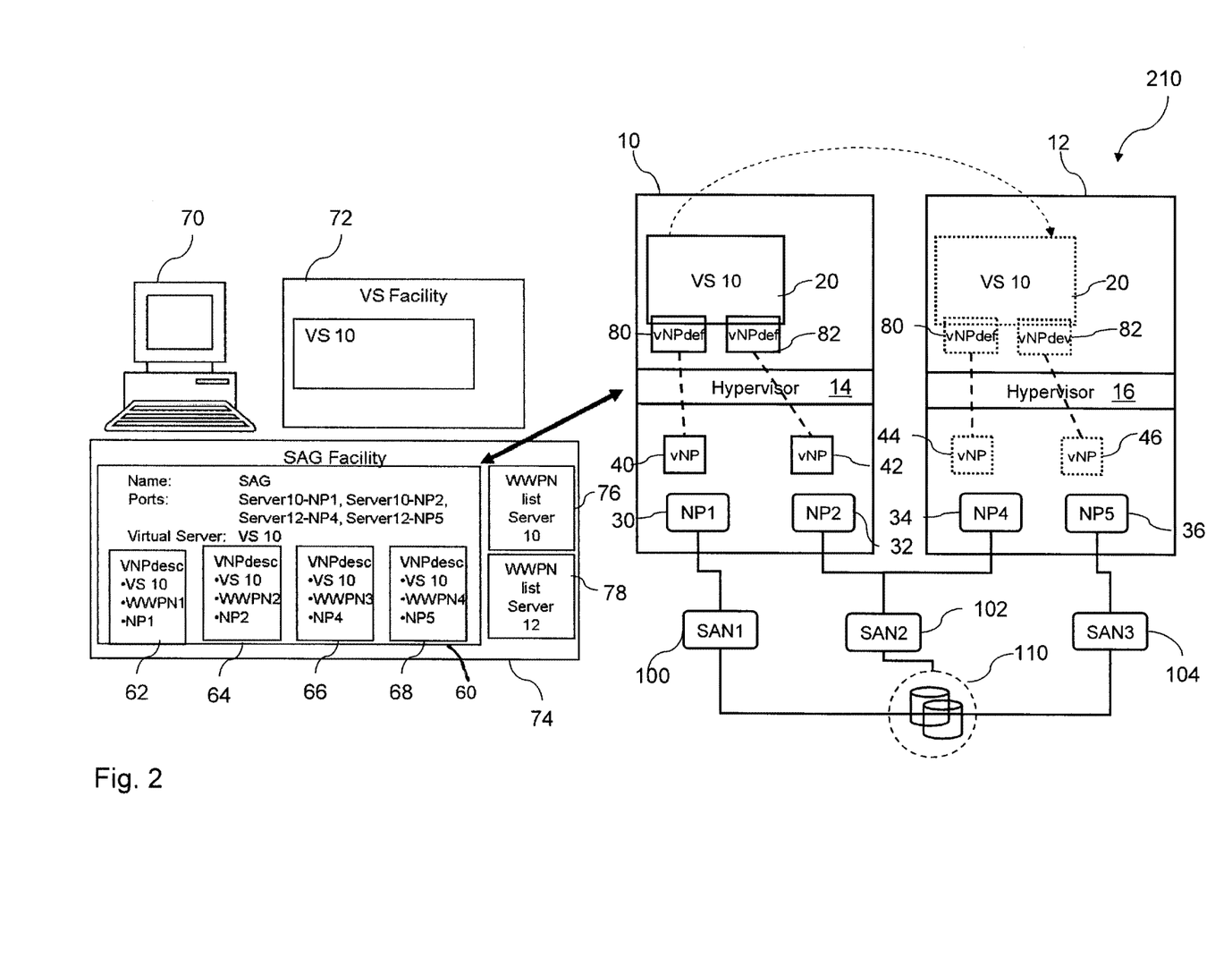
FIG. 2 an overview of the implementation of storage access groups for managing virtual network ports according to an embodiment of the invention.

FIG. 2 gives an overview of an implementation of storage access groups 60 for managing virtual network ports 40, . . . according to an embodiment of the invention. In FIG. 2 the method is exemplified for an embodiment being used for migrating a virtual server 20 from one physical server 10 to a target physical server 12. This embodiment is explained in more details in FIG. 5. FIG. 2 serves for demonstrating how a management console 70 as some high level management function of the system 210 is used for creating and managing a storage access group 60 providing access to a group of storage resources for a virtual server 20 from one or more physical servers 10, 12, comprising a virtual server management facility 72 and a storage access group facility 74, wherein the virtual server management facility 72 allows for managing virtual server definitions and activating, deactivating, and migrating virtual servers 20, 22, wherein the storage access group facility 74 allows for managing virtual network port descriptions 62, . . . , administrating network port names (WWPN1, WWPN2, . . . ), and creating, activating and deactivating virtual network ports 40, . . . The virtual server 20, running on the physical servers 10, 12 is managed by the virtual server facility 72. The storage access group 60 comprises a number of virtual network port descriptions 62, 64, 66, 68, whereas the SAG facility 74 itself incorporates lists of network port names 76, 78 for being used by assigning virtual network ports to the virtual server 20.

Figure 3:
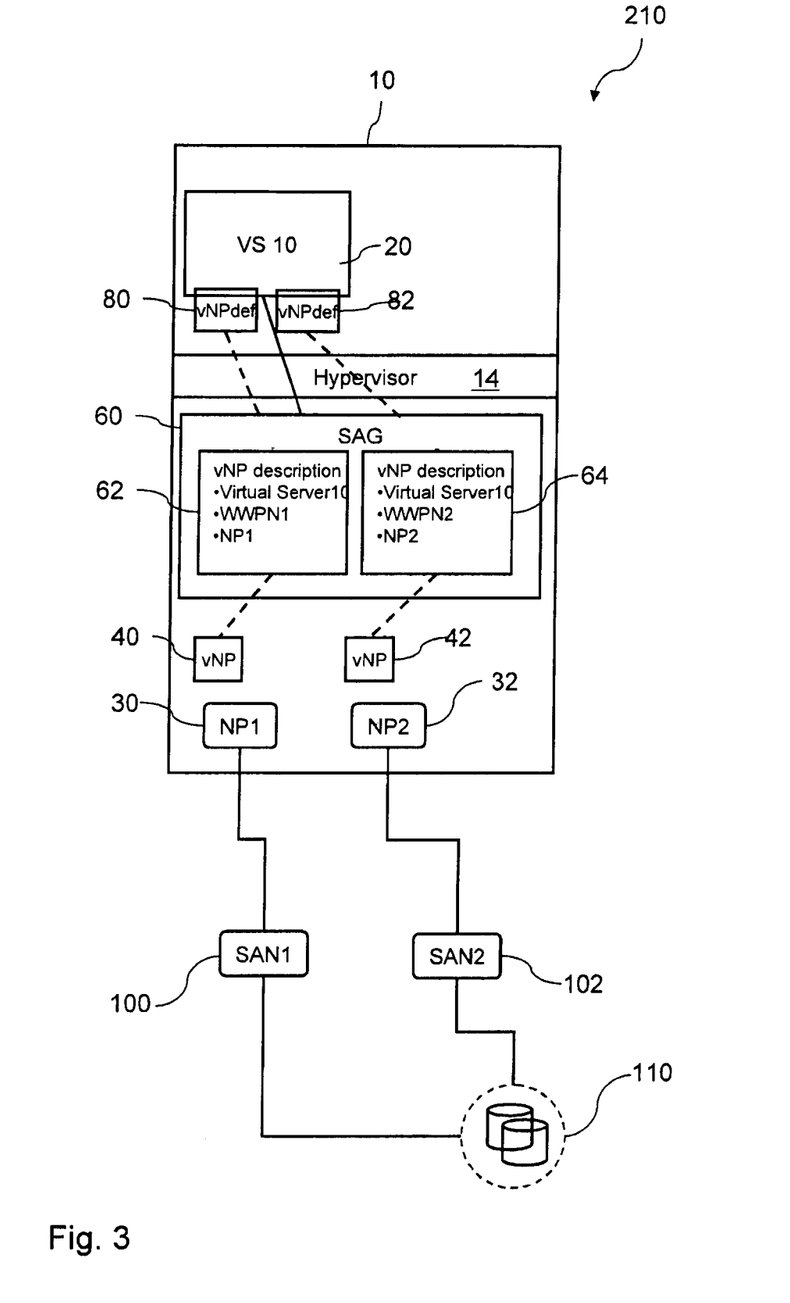
FIG. 3 an overview of a method for creating virtual network ports using storage access groups according to an embodiment of the invention.

FIG. 3 gives an overview of a method for the creation and assignment of vNPs using storage access groups according to an embodiment of the invention. The goal is to provide virtual server 20 access to the storage resources 110 through vNPs. Storage resources 110 are accessible via networks 100, 102. Networks 100 and 102 are accessed via network ports 30 and 32 by the physical server 10. A storage access group 60 is created, representing the group of storage resources 110 and a plurality of virtual network ports. vNP descriptions 62, 64 describe the properties of the virtual network ports. vNPs 40, 42 are the actual virtual network ports that will be activated and used in order to access the group of storage resources 110. Network ports 30 and 32 are added to the storage access group 60. Further, an administrator creates a virtual server 20 and adds it to storage access group 60. As the virtual server 20 is added to the storage access group 60, vNP descriptions 62 and 64 are created. Each vNP description 62 and 64 gets assigned a network port name WWPN1, WWPN2 from the port name pool. A WWPN is associated with an individual network port and a virtual server.

The administrator adds two virtual network port definitions 80, 82 to the virtual server definition. Each of these two virtual network port definitions 80, 82 reference storage access group 60 and describe a unique (within the virtual server definition) device identifier.

A hypervisor 14 is being executed on the physical server 10. A virtual server 20 is activated on the hypervisor 14. In order to provide the virtual server 20 access to the networks 100, 102, the system uses vNP definitions 80, 82 in order to identify the number of vNPs required by the virtual server 20, and represented by the storage access group 60, which represents the storage resources 110 to be accessed. The system finds matching vNP descriptions 62, 64 in the storage access group 60. The system activates vNP 40 on the physical server 10, NP 30, based upon the vNP description 62 and vNP definition 80. The system activates vNP 42 on the physical server 10, NP 32, based upon the vNP description 64 and vNP definition 82. vNPs 40, 42 are now active in the physical server 10 and can be used by virtual server 20 in order to access storage resources 110.

Figure 4:
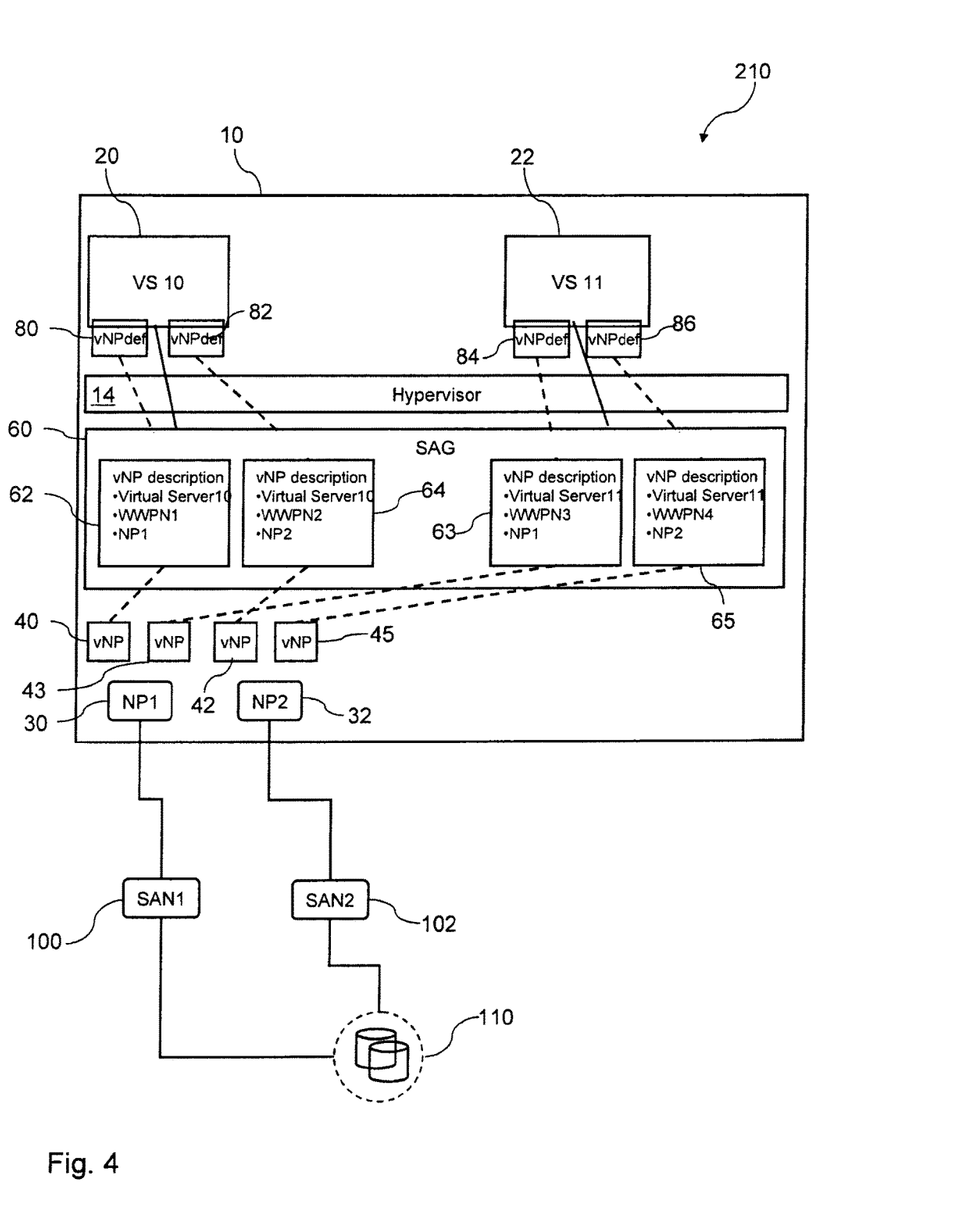
FIG. 4 a process for adding a virtual server to a storage access group according to another embodiment of the invention.

In FIG. 4 a second virtual server 22 requires access to the same group of storage resources 110, represented by storage access group 60. The administrator adds virtual server 22 to storage access group 60. The system creates virtual network port descriptions 63, 65. The administrator adds virtual network port definitions 84, 86 to virtual server 22. When activating virtual server 22 the system creates and activates vNPs 43, 45 and provides virtual server 22 access to storage resources 110 in a manner similar to what has been already described for activating virtual server 20.

Ideally, all vNPs described by a storage access group provide access to the same group of storage resources. A consistency of a storage access group 60 is validated by performing network discovery through all virtual network ports described by virtual network port descriptions 62, 64, 63, 65. Discovery reports back accessible storage resources. The consistency is validated if the virtual network ports 40, 42, 43, 45 of the storage access group 60 provide the same access to the storage resource 110.

The storage administrator, in one embodiment, requires network port names WWPN1, WWPN2, . . . in order to configure access control in network 100 and permit virtual network ports 40, 42, 43, 45 access to storage resources 110. The system allows exporting this required information by providing an export task for storage access group 60. The export task exports a list with all virtual network port descriptions 62, 64, 63, 65, and for each virtual network port description, the list describes the system, the network port 30, or 32, and network port names WWPN1, WWPN2, . . . .

Figure 5:
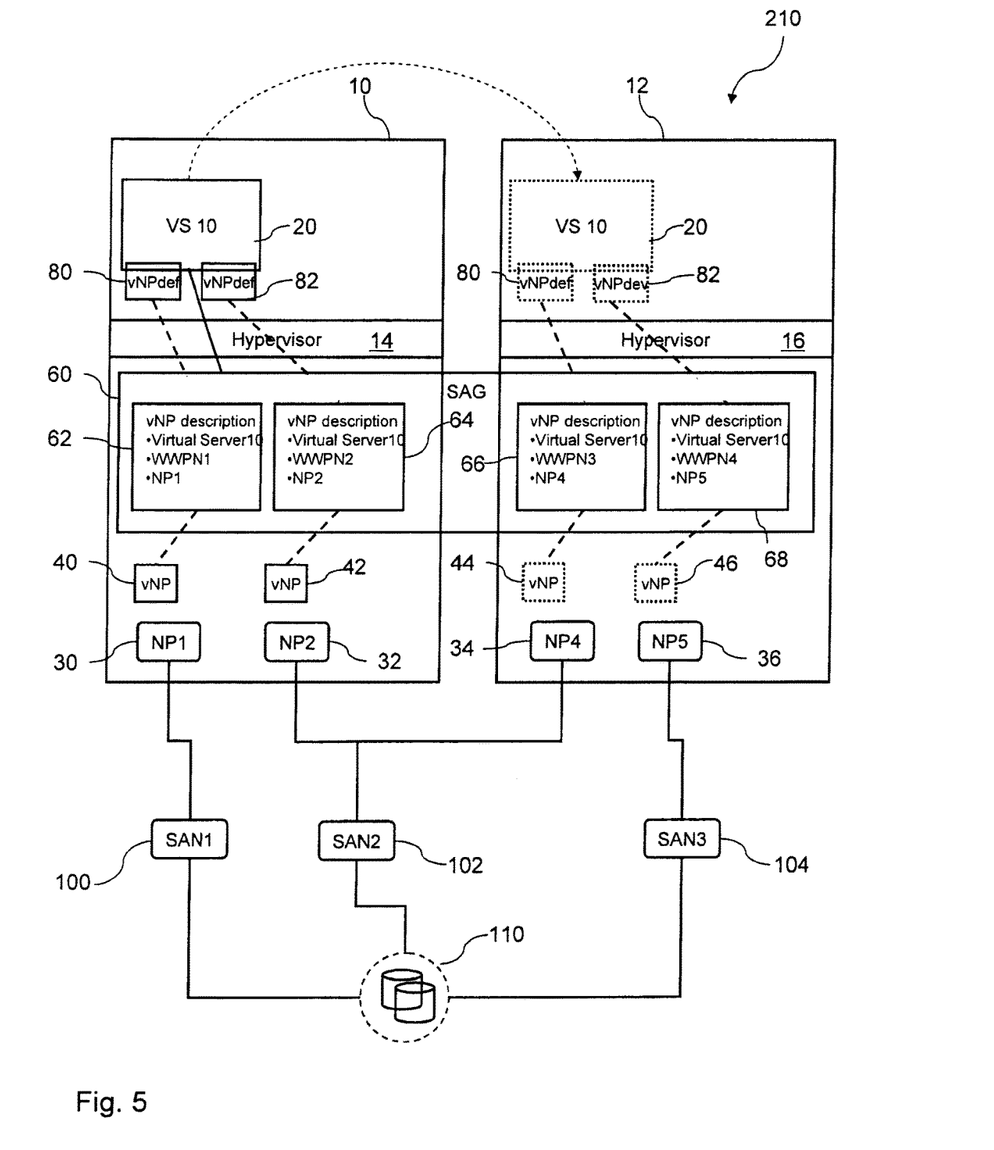
FIG. 5 a process for migration or deployment of a virtual server to another physical server according to a further embodiment of the invention.

FIG. 5 is explaining a process for migration or deployment of a virtual server 20 to another physical server 12 according to a further embodiment of the invention. Virtual server 20 requires access to the same group of storage resources 110 when running on either the physical server 10 or the physical server 12. The administrator in this case adds network ports 34 and 36 to storage access group 60, in addition to network ports 30 and 32. The administrator further adds virtual server 20 to storage access group 60. The system now creates virtual network port descriptions 62, 64, 66, and 68. The administrator adds two virtual network port definitions 80, 82 to the virtual server 20 definition. The same virtual network port definitions 80, 82 are used for virtual server 20 when it is running on either physical server 10 or physical server 12. Because the device identifiers used by virtual server 20 are associated with vNP definitions 80, 82, the device identifiers therefore do not change when migration occurs. The operating system running in the virtual server 20 will thus always see the same device identifiers connecting to the same group of storage resource 110, independently of the physical server, the virtual server 20 is running on. The operating system thus can base its I/O configuration upon this device identifier.

Activation of the virtual server 20 is performed in the same way as described with FIG. 2.

A virtual server 20 is migrated to a physical server 12 by first identifying the physical server 12 where the virtual server 20 is to be migrated. Next the system identifies the storage access group 60, referenced by virtual network port definitions 80, 82 of virtual server 20. The system finds matching vNP descriptions 62, 64, 66, 68 in storage access group 60. The system activates vNP 44 on the physical server 12, NP 34, based upon the vNP description 66 and vNP definition 80. The system activates vNP 46 on the physical server 12, NP 36, based upon the vNP description 68 and vNP definition 82. vNPs 44, 46 are now active in the physical server 12 and can be used by virtual server 20 in order to access storage resources 110.

After performing the migration to system 12 the system de-activates vNP 40 (referenced by virtual network port 62) on the physical server 10, NP 30, based upon the vNP description 62. The system de-activates vNP 42 (referenced by virtual network port 64) on the physical server 10, NP 32, based upon the vNP description 64.

Deploying a virtual server 20 is achieved by nearly the same steps, except that no virtual network ports need to be de-activated.

Figure 6:
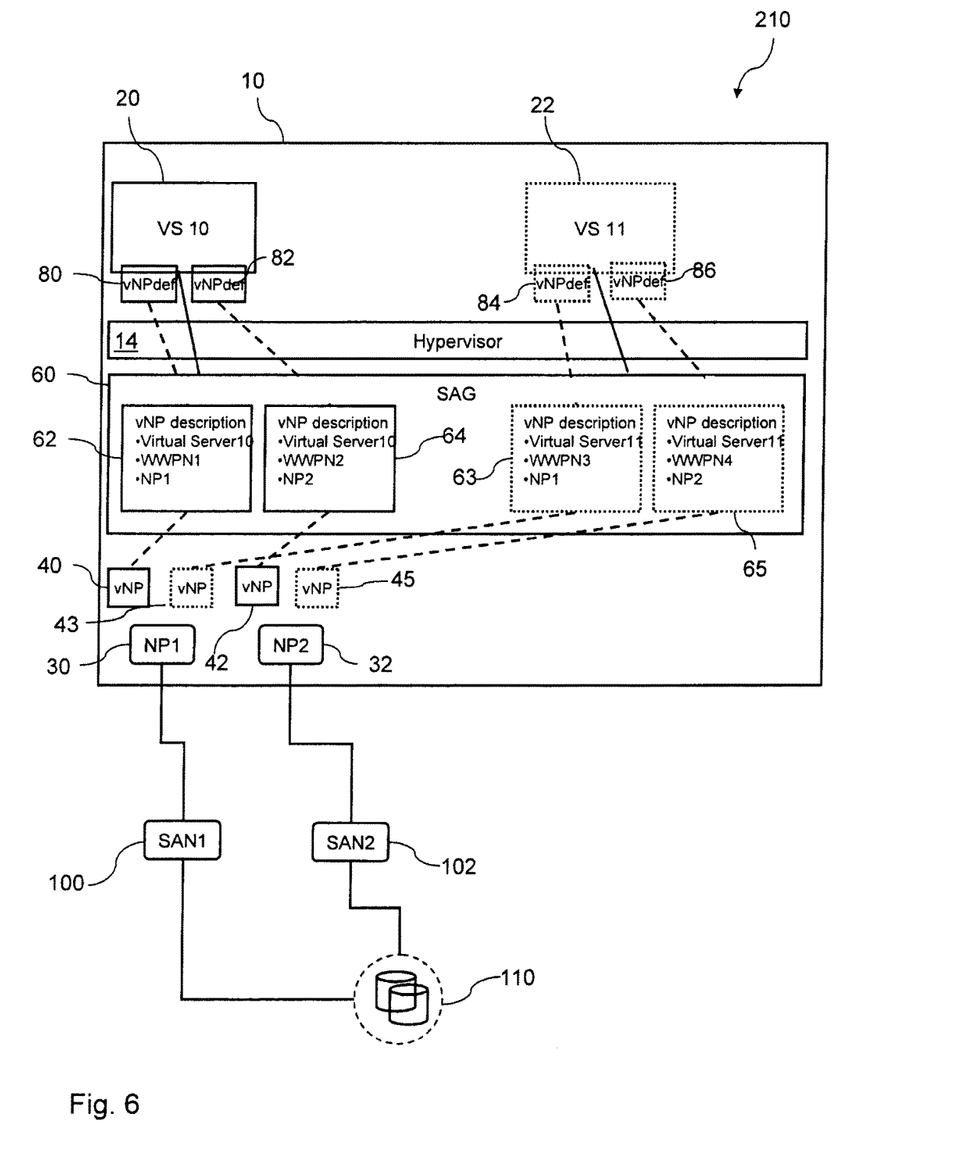
FIG. 6 a process for removing a virtual server from a storage access group according to a further embodiment of the invention.

FIG. 6 is explaining a process for removing a virtual server 22 from a storage access group 60 according to a further embodiment of the invention. The administrator removes virtual network port definitions 84, 86 from virtual server 22. If virtual server 22 is active, the system de-activates virtual network ports 43, 45. The administrator then can remove all virtual network port descriptions for virtual server 22 from storage access group 60 by specifying the storage access group, the virtual server, and requesting the removal.

Network port 30 may be removed from a storage access group 60 comprising the steps (i) identifying all virtual network port descriptions 62, 63 assigned to the network port 30; (ii) checking if no active virtual network port 40, 43 exists; (iii) removing virtual network port descriptions 62, 63 from the storage access group 60 assigned to the network port 30; (iv) removing the network port 30 from the storage access group 60.

A virtual server might have fewer virtual network port definitions 80, 82, than network ports 30, . . . that are accessible in the storage access group 60 on the hypervisor 14 in which the virtual server 20 is currently active. The system will then only activate the required number of virtual network ports 30, . . . .

A system may automatically add virtual network port definitions 80, 82 to a virtual server 20, when the virtual server 20 is added to a storage access group 60 and vNP descriptions 62, 64 are created.

A system may allow an administrator specifying just the number of virtual servers 20, . . . that will need access to a storage access group 60, rather than adding specific virtual servers 22, . . . to a storage access group 60. This allows the system to create virtual network port descriptions 62, . . . (including WWPNs). A SAN administrator can then grant access in the SAN to the group of storage resources 110 represented by the storage access group 60 based upon those WWPNs before a virtual server 20 is created. When a virtual server 20 is added to a storage access group 60, the system checks, if virtual network port descriptions 62 exist, which have not been reserved to a particular virtual server 20. If so, the virtual server 20 will be added to the virtual network port description 62. If no such virtual network port description 62 exists, the system will create a new virtual network port description 62.

Similarly, a system may allow an administrator to specify just the total number of virtual network port descriptions 62, . . . /network ports 30, . . . that should be available in a storage access group 60, or the total number of virtual network descriptions 62, . . . per network port 30, . . . that should be available in a storage access group 60, rather than either adding specific virtual servers 20, . . . or specifying a number of virtual servers 20, . . . . The SAN administrator can then configure the SAN based on those WWPNs for the number of virtual network port descriptions 62, . . . specified/created. When a virtual network port definition 80 is added to a virtual server 20, the system checks if a virtual network port description 62 exists that has not been already reserved to a particular virtual server 20. If so, the addition of the virtual network port definition 80 is allowed. If not, the administrator is warned and either given the option of having the system create additional virtual network port descriptions 60 or canceling the addition of the virtual network port definition 80.

Figure 7:
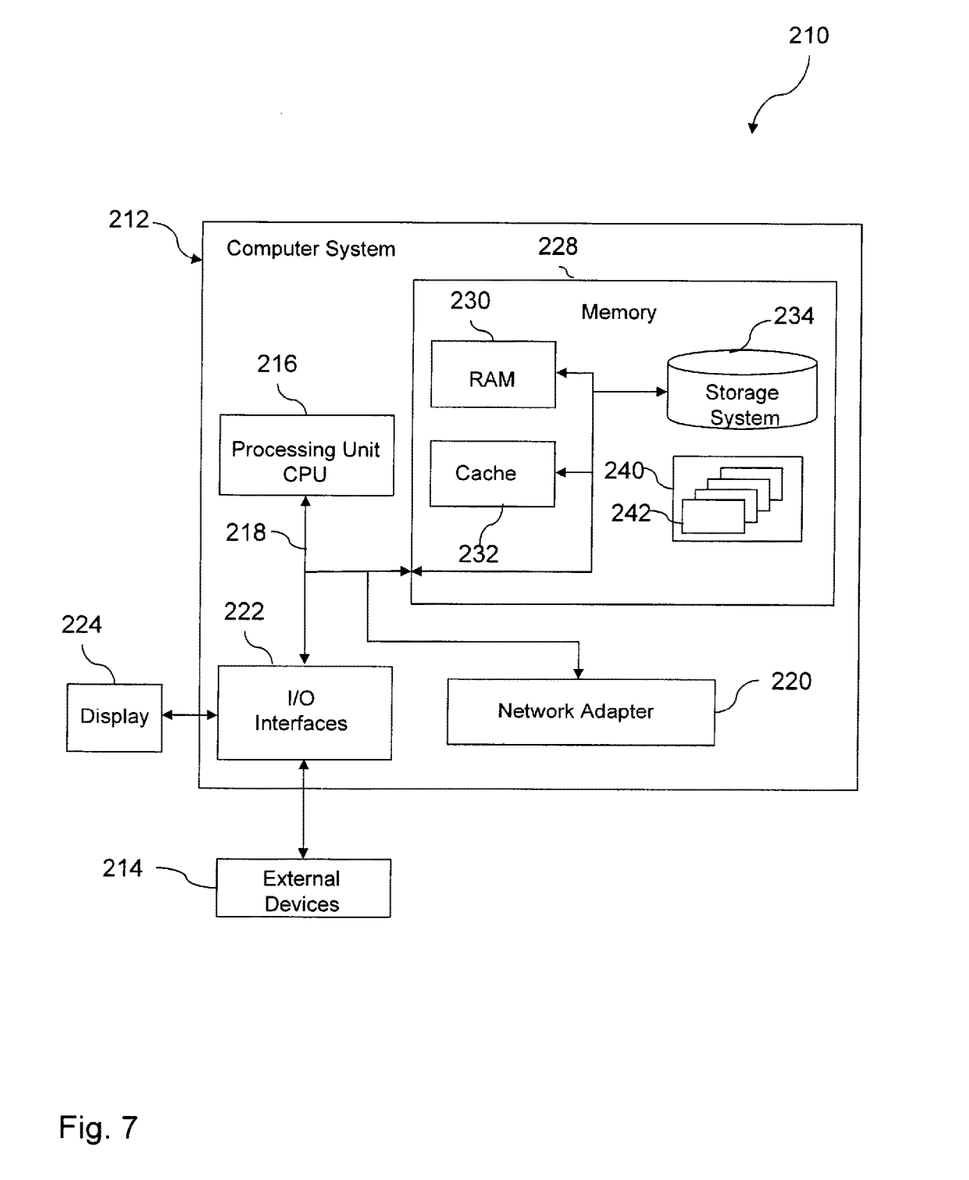
FIG. 7 an example embodiment of a data processing system for carrying out a method according to one or more aspects of the invention.

Referring now to FIG. 7, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system, in particular a server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

As described herein, according to a first aspect of the invention, a method is provided for managing virtual network ports on a physical server to provide a virtual server access to a group of storage resources through a network, comprising the steps (i) generating a storage access group representing a group of storage resources; (ii) executing a hypervisor on the physical server; (iii) generating a virtual server on said hypervisor; (iv) for the virtual server activating access to said network, wherein a management console is provided for creating and managing the storage access group providing access to the group of storage resources for the virtual server from one or more physical servers, comprising a virtual server management facility and a storage access group facility, wherein the virtual server management facility allows for managing virtual server definitions and activating, deactivating, migrating virtual servers, wherein the storage access group facility allows for managing virtual network port descriptions, administrating network port names (WWPN1, WWPN2, . . . ), creating, activating and deactivating virtual network ports. The management console represents a high level management function to manage virtual servers and storage access groups across not only one physical server, but allows to incorporate a number of different servers, such that a single storage access group may be used for more than one server.

Access for a virtual server to a group of storage resources through a network may be provided, comprising the steps of (i) using a port name pool assigned to a physical server attached to said network; (ii) accessing said network via at least one physical network port in a network adapter by the physical server; (iii) generating a storage access group (SAG) representing a group of storage resources; (iv) adding to the storage access group all network ports which provide access to the group of storage resources; (v) executing a hypervisor on the physical server; (vi) generating a virtual server on said hypervisor including one or more virtual network port definitions; (vii) adding the virtual server to the storage access group, which requires access to the group of storage resources represented by the storage access group; (viii) creating virtual network port descriptions for each combination of virtual server and network port, wherein a virtual network port description gets assigned a network port name (WWPN1, WWPN2, . . . ) from a port name pool; (ix) adding virtual network port definitions to the virtual server, referencing the storage access group, and a device identifier; (x) for each of said virtual network port definitions assigning a reference to a storage access group and a unique device identifier; (xi) for the virtual server activating access to said network by (A) obtaining the storage access group from the virtual network port definition; (B) selecting virtual network port descriptions from the storage access group, belonging to network ports, available to the hypervisor, the virtual server is active or to be activated on; (C) creating and activating a virtual network port on the network port using the network port names (WWPN1, WWPN2, . . . ) described by the virtual network port descriptions; (D) making the virtual network port available through the hypervisor using the device identifier from the virtual network port definition of the virtual server.

A device identifier is used by an operating system to base its I/O configuration, for example for a virtual network port, upon. Linux, for example uses device nodes. z/VM uses device numbers. By adding a device identifier and referencing a storage access group, the virtual network port as seen by an operating system under a specific device identifier will always provide access to the same group of storage resources. No matter which adapter port and/or WWPN, the system chooses to provide a connection to the group of storage resources.

One or more aspects of the invention relate to a virtualized environment with a computer or computer platforms connected to storage area networks (SAN), providing a hypervisor with support for virtual servers and Fibre Channel Protocol (FCP) storage for disk I/O processes.

Thus, one or more aspects of the method support eliminating the dependency between system and SAN configuration, concerning adding/removing virtual servers, adding/removing network ports (NPs), planning for virtual server migration, adding/removing, or sharing storage resources. Further, one or more aspects support the management of systems comprising a large number of virtual network ports (vNPs), exhibiting 16 hex digit WWPNs, as well as the server administration for the creation, assigning and managing of individual vNPs. Further, one or more aspects exhibit advantages where separate management domains (server and SAN) exist and especially where a server configuration only partly reflects a SAN configuration.

In one aspect, by managing vNPs based upon storage access groups (SAGs) the user only has to specify (a group of) virtual servers, and network ports. The SAG facility creates vNPs/WWPNs, on different servers, if required. This action is taken independently of a virtual server, which means activation of a vNP may be undertaken independently of a virtual server. That is, vNP connectivity can be validated on a physical server which is only a potential target for a virtual server migration. The virtual server only describes requirements towards the storage resources that need to be accessed. The SAG facility picks and assigns a vNP as the virtual server requires it. vNPs are managed as a group, not as individual vNPs. They reflect the SAN configuration and it allows the system to validate that a group of vNPs indeed has access to the same group of storage resources. This is much more convenient than having the administrator implicitly and/or manually group vNPs and validate access.

Only minor input from a server administrator to create and manage vNPs for virtual servers is used. The basis of the method exhibits a group of storage resources and virtual servers, where access to a network or network resources is required and NPs are used to access the network resources. A group of vNPs is created for the group of storage resources, instead of having an administrator create them individually as in the state of the art. vNPs are managed as a group. Information is added to the group of vNPs that allows relating server and SAN configuration.

Storage access groups (SAGs) are introduced to simplify the management of vNPs. The complexity of managing individual vNPs is hidden. A SAG represents a group of storage resources and virtual servers requiring access to the group of storage resources and network ports a system administrator wants to use to access these storage resources. The system automatically determines the number of vNPs required, creates vNPs for virtual servers as needed, allows the user to export the WWPNs of all the vNPs in the SAG for the SAN administrator to perform the SAN configuration. Further, the system allows the user to assign vNPs to virtual servers manually, or permit the assignment to be done automatically. The system selects vNPs to be used for a virtual server depending on the computer and/or platform the virtual server is running on. The identity stays the same for each of the vNPs from a virtual server perspective. The system automatically activates vNPs as needed.

Thus, the system and SAN configuration may be kept synchronized. The storage access group reflects the SAN configuration. It represents a set of storage resources plus the network connectivity via NPs and WWPNs of vNPs. The storage access group information provides a logical grouping of server and storage resources. The WWPNs of the vNPs of storage access groups are required to grant access permission in the SAN (zoning) and storage subsystem (LUN masking) The system allows export of storage access group information, as well as verification of consistency of a storage access group. vNPs are treated as a group meaning equal connectivity and access permission where the system provides the task to validate consistency.

In one embodiment, a vNP for a virtual server may be generated and activated on said hypervisor comprising the steps (i) creating at least one virtual network port description within a storage access group for each physical network port of the storage access group with a unique WWPN; (ii) assigning one virtual network port description to each of the virtual network port definitions defined as part of the virtual server definition; (iii) obtaining the device identifier for each of the at least one virtual network port definitions of the virtual server; and (iv) activating the vNP in the NP, the physical server, and the hypervisor, using said device identifier, and the WWPN. This means that a user may simply add a virtual server to a storage access group. The system creates and activates the vNPs. The user has only to export the WWPNs for a group of vNPs to setup the SAN access permission, where assigning the vNPs to the virtual server and activating them is done automatically by the system.

Another virtual server requiring access to the same group of storage resources may be added to a storage access group further comprising the steps (i) adding the virtual server to a storage access group; (ii) creating at least one virtual network port description for each network port in the storage access group for this virtual server, each virtual network port description containing a unique WWPN; (iii) adding a vNP definition to the virtual server definition, referencing the storage access group, and a device identifier; (iv) for each of said virtual network port definitions assigning a reference to a storage access group and a unique device identifier; and (v) if the virtual server is active, or to be activated: activating the vNP in the NP, the physical server, and the hypervisor, using said device identifier, and the WWPN. In one embodiment, user interaction is only used for steps (i), (iii), and (iv).

In one embodiment, a virtual server may be migrated to a target physical server further comprising the steps (i) identifying the target physical server where the virtual server is to be migrated; (ii) adding network ports of said physical server to the storage access group; (iii) creating vNP descriptions in the storage access group for each of the newly added network ports, each virtual network port description containing a unique WWPN; (iv) determining the at least one virtual network port to be activated on the target physical server; (v) activating the at least one virtual network port on the target physical server using device identifiers from the virtual network port definitions and WWPNs from the virtual network port descriptions to access the networks that the target physical server is connected to; and (vi) after migration of the virtual server, de-activating vNPs on the source physical server.

In one embodiment, user interaction is only used for steps (i) and (ii). Thus, the user has to add only minimum input to the system concerning the network ports to be available on the target physical server, whereas all other actions may be undertaken by the system itself.

In a similar embodiment, a virtual server may be deployed further comprising the steps (i) identifying the physical server where the virtual server is to be deployed; (ii) adding network ports of said physical server to the storage access group; (iii) creating vNP descriptions in the storage access group for each of the newly added network ports, each virtual network port description containing a unique WWPN; (iv) determining the at least one virtual network port to be activated on the physical server; and (v) activating the at least one virtual network port on the physical server using device identifiers from the virtual network port definitions and WWPNs from the virtual network port descriptions to access the networks that the physical server is connected to. In one embodiment, user interaction is only used for steps (i) and (ii). Here, too, minimum input to the system is required to perform the action.

Access to a group of storage resources of a virtual server may be removed by (i) identifying vNP definitions of the virtual server for the storage access group; (ii) de-activating any assigned and/or active vNPs; (iii) removing virtual network port definitions from the virtual server; and (iv) removing the virtual server from the storage access group which will remove vNP descriptions from the system. Thus, removing access from the virtual server is focused on a storage access group, rather than removing individual vNPs from the virtual server and the system.

A network port may be removed from a network further comprising the steps (i) identifying the storage access groups containing the NP; (ii) checking that none of the vNPs in the storage access groups are active on the NP; if any of the vNPs is active, the vNP description in the storage access group will identify the virtual server using it; the vNP can then be deactivated (manually, or in an automated way); and (iii) removing the network port from the storage access group which will remove virtual network port descriptions from the storage access group. This embodiment too is focused, in one embodiment, on performing the action on a storage access group and may require minimum input from the user.

All vNPs in a storage access group are supposed to provide access to the same group of storage resources. In one embodiment, a consistency of a storage access group may be validated performing network discovery through all virtual network ports described by virtual network port descriptions. Discovery reports back accessible storage resources. The consistency is validated if all virtual network ports of the storage access group provide the same access to the storage resources that are represented by the storage access group.

Exporting information about the network may be performed by exporting a list of all virtual network port descriptions. For each virtual network port description, the list describes the system, the network port, the virtual network port name, and the storage access group name, meaning that all relevant information about the network is concentrated in the information about a storage access group.

According to a further aspect of the invention, a data processing program for execution in a data processing system is proposed comprising an implementation of an instruction set for performing a method as described above when the data processing program is run on a computer.

Further, a computer program product is proposed comprising a computer usable medium including a computer readable program, wherein the computer readable program when executed on a computer causes the computer to perform a method for managing virtual network ports on a physical server to provide a virtual server access to a group of storage resources through a network, comprising the steps (i) generating a storage access group representing a group of storage resources; (ii) executing a hypervisor on the physical server; (iii) generating a virtual server on said hypervisor; (iv) and for the virtual server activating access to said network, wherein a management console is provided for creating and managing the storage access group providing access to the group of storage resources for the virtual server from one or more physical servers, comprising a virtual server management facility and a storage access group facility, wherein the virtual server management facility allows for managing virtual server definitions and activating, deactivating, and migrating virtual servers, wherein the storage access group facility allows for managing virtual network port descriptions, administrating network port names (WWPN1, WWPN2, . . . ), and creating, activating and deactivating virtual network ports.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a solid state storage medium, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function and/or act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions and/or acts specified in the block diagram block or blocks.

Due to a further aspect of the invention, a data processing system for execution of a data processing program is proposed, comprising software code portions for performing a method described above.

What is claimed is:

1. A computer-implemented method of accessing storage resources of a computing environment, said computer-implemented method comprising:
   creating a storage access group used to manage one or more virtual network ports of a physical server of the computing environment, the one or more virtual network ports used to access one or more groups of storage resources of the computing environment, the one or more groups of storage resources being coupled to one or more networks, the one or more networks being coupled to the physical server via one or more network ports identified in the storage access group;
   activating a virtual server on a hypervisor executing on the physical server and providing one or more virtual network port definitions for the virtual server to identify a number of virtual network ports to be used by the virtual server to access at least one group of storage resources of the one or more groups of storage resources;
   adding an indication of the virtual server to the storage access group;
   creating, based on adding the indication of the virtual server to the storage access group, at least one virtual network port description, wherein a virtual network port description of the at least one virtual network port description is assigned a network port name that is associated with a network port of the one or more network ports and the virtual server;
   automatically activating, absent user interaction, a virtual network port on the physical server to provide access to at least one group of storage resources, the automatically activating being based upon a selected virtual network port description of the at least one virtual network port description and at least one virtual network port definition of the one or more virtual network port definitions; and
   accessing, by the virtual server, using the virtual network port, a network port, and a network of the one or more networks, one or more storage resources of the at least one group of storage resources, the network port identified in the selected virtual network port description used to activate the virtual network port.

2. The computer-implemented method according to claim 1, wherein the providing the one or more virtual network port definitions comprises automatically adding the one or more virtual network port definitions to the virtual server, based on the virtual server being added to the storage group and creating the at least one virtual network port description.

3. The computer-implemented method according to claim 1, further comprising:
   automatically creating one or more virtual network port descriptions, based on obtaining an indication of a number of virtual servers to access the storage access group,
   making the virtual network port available through the hypervisor using the unique device identifier from the virtual network port definition of the virtual server.

4. The computer-implemented method according to claim 1, further comprising:
   creating one or more virtual network port descriptions within the storage access group for each network port of the storage access group with a unique network port name (WWPN);
   assigning one virtual network port description to each virtual network port definition defined as part of a virtual server definition;
   obtaining a device identifier for each of the at least one virtual network port definition of the virtual server; and
   activating the virtual network port in a physical network port, the physical server, and the hypervisor, using a selected device identifier and WWPN.

5. The computer-implemented method according to claim 1, further comprising:
   adding to the storage access group another virtual server to access the same one or more storage resources;
   creating at least one virtual network port description for each network port in the storage access group for this other virtual server, each virtual network port description containing a unique network port name (WWPN);

adding a virtual network port definition to a definition of the other virtual server;

for the virtual network port definition, assigning a reference to a respective virtual network port description of the storage access group and a unique device identifier; and based on the other virtual server being active or to be activated, activating a virtual network port in a physical network port, the physical server, and the hypervisor, using a selected device identifier and WWPN.

6. The computer-implemented method according to claim 1, further comprising migrating the virtual server from a source physical server to a target physical server, the migrating comprising:

identifying the target physical server where the virtual server is to be migrated;

adding one or more network ports of said target physical server to the storage access group;

creating one or more virtual network port descriptions in the storage access group for each of the newly added network ports, each virtual network port description containing a unique network port name (WWPN);

determining at least one virtual network port to be activated on the target physical server;

activating the at least one virtual network port on the target physical server using device identifiers from virtual network port definitions and WWPNs from the one or more virtual network port descriptions to access the network that the target physical server is connected to; and after migration of the virtual server, de-activating at least one virtual network port on the source physical server.

7. The computer-implemented method according to claim 1, further comprising deploying the virtual server, the deploying comprising:

identifying the physical server where the virtual server is to be deployed;

adding one or more network ports of said physical server to the storage access group;

creating one or more virtual network port descriptions in the storage access group for each of the newly added network ports, each virtual network port description containing a unique network port name (WWPN); and determining at least one virtual network port to be activated on the physical server.

8. The computer-implemented method according to claim 1, further comprising:

identifying one or more virtual network port definitions of the virtual server;

de-activating at least one of one or more assigned and active virtual network ports;

removing the one or more virtual network port definitions from the virtual server; and removing the virtual server from the storage access group, which removes virtual network port descriptions.

9. The computer-implemented method according to claim 1, further comprising removing a network port from the network, the removing comprising:

identifying one or more storage access groups containing the network port;

based on checking that none of the virtual network ports in the one or more storage access groups are active on the network port, deactivating the virtual network ports; and removing the network port from the storage access group which removes virtual network port descriptions from the storage access group.

10. The computer-implemented method according to claim 1, further comprising validating consistency of the storage access group, the validating consistency comprising:

performing network discovery through virtual network ports described by virtual network port descriptions;

reporting back discovery reports of accessible storage resources; and validating the consistency if the virtual network ports of the storage access group provide the same access to the storage resources.

11. The computer-implemented method according to claim 1, further comprising exporting information about the network, the exporting comprising exporting a list of virtual network port descriptions.

12. A computer program product for accessing storage resources of a computing environment, the computer program product comprising:

a non-transitory computer readable storage medium readable by a processing circuit and storing instructions for execution by the processing circuit for performing a method comprising:

creating a storage access group used to manage one or more virtual network ports of a physical server of the computing environment, the one or more virtual network ports used to access one or more groups of storage resources of the computing environment, the one or more groups of storage resources being coupled to one or more networks, the one or more networks being coupled to the physical server via one or more network ports identified in the storage access group;

activating a virtual server on a hypervisor executing on the physical server and providing one or more virtual network port definitions for the virtual server to identify a number of virtual network ports to be used by the virtual server to access at least one group of storage resources of the one or more groups of storage resources;

adding an indication of the virtual server to the storage access group;

creating, based on adding the indication of the virtual server to the storage access group, at least one virtual network port description, wherein a virtual network port description of the at least one virtual network port description is assigned a network port name that is associated with a network port of the one or more network ports and the virtual server;

automatically activating, absent user interaction, a virtual network port on the physical server to provide access to at least one group of storage resources, the automatically activating being based upon a selected virtual network port description of the at least one virtual network port description and at least one virtual network port definition of the one or more virtual network port definitions; and accessing, by the virtual server, using the virtual network port, a network port, and a network of the one or more networks, one or more storage resources of the at least one group of storage resources, the network port identified in the selected virtual network port description used to activate the virtual network port.

13. The computer program product according to claim 12, wherein the providing the one or more virtual network port definitions comprises automatically adding the one or more virtual network port definitions to the virtual server, based on the virtual server being added to the storage group and creating the at least one virtual network port description.

14. The computer program product according to claim 12, wherein the method further comprises:
- creating one or more virtual network port descriptions within the storage access group for each network port of the storage access group with a unique network port name (WWPN);
- assigning one virtual network port description to each virtual network port definition defined as part of a virtual server definition;
- obtaining a device identifier for each of the at least one virtual network port definition of the virtual server; and
- activating the virtual network port in a physical network port, the physical server, and the hypervisor, using a selected device identifier and WWPN.

15. The computer program product according to claim 12, wherein the method further comprises migrating the virtual server from a source physical server to a target physical server, the migrating comprising:
- identifying the target physical server where the virtual server is to be migrated;
- adding one or more network ports of said target physical server to the storage access group;
- creating one or more virtual network port descriptions in the storage access group for each of the newly added network ports, each virtual network port description containing a unique network port name (WWPN);
- determining at least one virtual network port to be activated on the target physical server;
- activating the at least one virtual network port on the target physical server using device identifiers from virtual network port definitions and WWPNs from the one or more virtual network port descriptions to access the network that the target physical server is connected to; and
- after migration of the virtual server, de-activating at least one virtual network port on the source physical server.

16. The computer program product according to claim 12, wherein the method further comprises deploying the virtual server, the deploying comprising:
- identifying the physical server where the virtual server is to be deployed;
- adding one or more network ports of said physical server to the storage access group;
- creating one or more virtual network port descriptions in the storage access group for each of the newly added network ports, each virtual network port description containing a unique network port name (WWPN); and
- determining at least one virtual network port to be activated on the physical server.

17. A computer system for accessing storage resources of a computing environment, the computer system comprising:
- a memory; and
- a processor in communications with the memory, wherein the computer system is configured to perform a method, said method comprising:
  - creating a storage access group used to manage one or more virtual network ports of a physical server of the computing environment, the one or more virtual network ports used to access one or more groups of storage resources of the computing environment, the one or more groups of storage resources being coupled to one or more networks, the one or more networks being coupled to the physical server via one or more network ports identified in the storage access group;
  - activating a virtual server on a hypervisor executing on the physical server and providing one or more virtual network port definitions for the virtual server to identify a number of virtual network ports to be used by the virtual server to access at least one group of storage resources of the one or more groups of storage resources;
  - adding an indication of the virtual server to the storage access group;
  - creating, based on adding the indication of the virtual server to the storage access group, at least one virtual network port description, wherein a virtual network port description of the at least one virtual network port description is assigned a network port name that is associated with a network port of the one or more network ports and the virtual server;
  - automatically activating, absent user interaction, a virtual network port on the physical server to provide access to at least one group of storage resources, the automatically activating being based upon a selected virtual network port description of the at least one virtual network port description and at least one virtual network port definition of the one or more virtual network port definitions; and
  - accessing, by the virtual server, using the virtual network port, a network port, and a network of the one or more networks, one or more storage resources of the at least one group of storage resources, the network port identified in the selected virtual network port description used to activate the virtual network port.

18. The computer system according to claim 17, wherein the providing the one or more virtual network port definitions comprises automatically adding the one or more virtual network port definitions to the virtual server, based on the virtual server being added to the storage group and creating the at least one virtual network port description.

19. The computer system according to claim 17, wherein the method further comprises:
- creating one or more virtual network port descriptions within the storage access group for each network port of the storage access group with a unique network port name (WWPN);
- assigning one virtual network port description to each virtual network port definition defined as part of a virtual server definition;
- obtaining a device identifier for each of the at least one virtual network port definition of the virtual server; and
- activating the virtual network port in a physical network port, the physical server, and the hypervisor, using a selected device identifier and WWPN.

20. The computer system according to claim 17, wherein the method further comprises migrating the virtual server from a source physical server to a target physical server, the migrating comprising:
- identifying the target physical server where the virtual server is to be migrated;
- adding one or more network ports of said target physical server to the storage access group;
- creating one or more virtual network port descriptions in the storage access group for each of the newly added network ports, each virtual network port description containing a unique network port name (WWPN);

determining at least one virtual network port to be activated on the target physical server;

activating the at least one virtual network port on the target physical server using device identifiers from virtual network port definitions and WWPNs from the one or more virtual network port descriptions to access the network that the target physical server is connected to; and after migration of the virtual server, de-activating at least one virtual network port on the source physical server.

* * * * *